United States Patent
Sahler et al.

(10) Patent No.: US 9,784,991 B2
(45) Date of Patent: Oct. 10, 2017

(54) PROCESS OF DETERMINATION OF A SEMI-FINISHED BLANK

(71) Applicant: ESSILOR INTERNATIONAL (COMPAGNIE GENERALE D'OPTIQUE), Charenton le Pont (FR)

(72) Inventors: Jean Sahler, Charenton le Pont (FR); Agnès Ladous, Charenton le Pont (FR); Bruno Amir, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 129 days.

(21) Appl. No.: 14/358,644

(22) PCT Filed: Nov. 9, 2012

(86) PCT No.: PCT/EP2012/072217
§ 371 (c)(1),
(2) Date: May 15, 2014

(87) PCT Pub. No.: WO2013/072249
PCT Pub. Date: May 23, 2013

(65) Prior Publication Data
US 2014/0347626 A1    Nov. 27, 2014

(30) Foreign Application Priority Data
Nov. 16, 2011   (FR) .................................. 11 60443

(51) Int. Cl.
*G02C 7/02* (2006.01)

(52) U.S. Cl.
CPC ............... *G02C 7/024* (2013.01); *G02C 7/02* (2013.01); *G02C 7/022* (2013.01); *G02C 7/028* (2013.01); *G02C 2202/08* (2013.01)

(58) Field of Classification Search
CPC ........... G02C 7/02; G02C 7/024; G02C 7/028
(Continued)

(56) References Cited

U.S. PATENT DOCUMENTS

| 4,181,409 A | 1/1980 | Reilly et al. |
| 6,176,577 B1 * | 1/2001 | Monnoyeur ............. G02C 7/02 351/159.2 |

(Continued)

FOREIGN PATENT DOCUMENTS

| EP | 20 028 527 | 2/2009 |
| EP | 2 253 990 | 11/2010 |

(Continued)

Primary Examiner — Zachary Wilkes
(74) Attorney, Agent, or Firm — Cozen O'Connor

(57) ABSTRACT

A method for determining a semi-finished lens blank, including the steps of: determining, for a given material, a set of faces $(S_1, S_2, \ldots S_n)$ to be defined for a line of ophthalmic lenses, each face (Si, Sj) being defined for a corresponding subset (SEi, SEj) of wearer data and/or frame data; determining, for each face (Si, Sj), a minimum thickness requirement (EnvSi, EnvSj) necessary to produce all the lenses of the corresponding subset (SEi, SEj); determining combinations of two faces (Si, Sj) to be paired; defining a "double-faced" semi-finished lens blank (SF(ij)) consisting of two paired defined faces (Si and Sj) and including the minimum thickness requirements (EnvSi and EnvSj) respectively determined for the faces, in a manner that allows producing all the lenses of the subsets (SEi and SEj) corresponding to said faces.

13 Claims, 2 Drawing Sheets

(58) Field of Classification Search
USPC .......................... 351/159.52, 159.74, 159.73
See application file for complete search history.

(56) References Cited

U.S. PATENT DOCUMENTS

| | | | | |
|---|---|---|---|---|
| 8,313,194 B2* | 11/2012 | Colas | ....................... | G02C 7/02 |
| | | | | 351/159.73 |
| 8,523,633 B2* | 9/2013 | Schneider | ............... | B24B 13/00 |
| | | | | 351/159.01 |
| 2010/0283966 A1* | 11/2010 | Colas | ....................... | G02C 7/02 |
| | | | | 351/159.81 |

FOREIGN PATENT DOCUMENTS

| WO | WO 97/38343 | 10/1997 |
|---|---|---|
| WO | WO 2006/084771 | 8/2006 |

* cited by examiner

PROCESS OF DETERMINATION OF A SEMI-FINISHED BLANK

RELATED APPLICATIONS

This is a U.S. National stage of International application No. PCT/EP2012/072217 filed on Nov. 9, 2012.

This patent application claims the priority of French application no. 11 60443 filed Nov. 16, 2011, the disclosure content of which is hereby incorporated by reference.

FIELD OF THE INVENTION

The invention relates to the field of ophthalmic lenses, and specifically to the determination of semi-finished lens blanks used to make wearable lenses.

BACKGROUND OF THE INVENTION

Any ophthalmic lens intended, to be worn in a frame is associated with wearer data and/or spectacle frame data. The ophthalmic prescription is one piece of wearer data; it may comprise a power prescription, plus or minus, as well as an astigmatism prescription. These prescriptions correspond to corrections enabling the lens wearer to correct vision defects. A lens is fitted in the frame in accordance with the prescription and the position of the wearer's eyes relative to the frame. For presbyopic wearers, the value of the power correction is different for far vision and near vision, due to the loss of accommodation in near vision. The prescription thus consists of a far-vision power value and an addition (or power progression) representing the power increment between far vision and near vision; basically this means a far-vision power prescription and a near-vision power prescription. Other wearer data may be taken into account, such as prismatic prescriptions, the position of the center of rotation of the eye, or other data. The frame data may, for example, include pantoscopic tilt, face form wrap, dimensions, templates, or other data.

Such an ophthalmic lens can be made by directly machining one of both faces of a glass block, using appropriate equipment. An ophthalmic lens may also be made from a semi-finished lens blank. A semi-finished lens blank has a defined face with a specific surface geometry, and an unfinished face which allows adapting the lens to the wearer data and/or data for the frame chosen by the wearer. An ophthalmic lens can then be made from a semifinished lens blank simply by machining the unfinished face, which is generally a spherical or toroidal surface.

A product line is defined as a family of lenses having common characteristics. For each line, a subset of wearer data and/or frame data are defined which determine the characteristics of the defined faces of the semifinished lens blanks. A set of semi-finished lens blanks is thus defined. Each semi-finished lens blank in a line must be able to satisfy a subset of wearer data and/or frame data. Each semi-finished lens blank must have the geometric characteristics, particularly the thickness, to allow machining the face opposite the defined face and allow making all the lenses in the family corresponding to the subset of wearer data and/or frame data for which it was defined.

For example, a line having a given progressive design with 5 base values, 12 addition values, and 2 eyes means 120 faces to accommodate. One could also define a line with other data, in particular design data (soft or hard for example), sphere values, cylinder values, data concerning the eye (right eye or left eye or customization data for the eye of the wearer for example). For a given line, the number of semi-finished lens blanks to be prepared is determined by the number of faces to be accommodated to cover all the wearer data and/or frame data that are possible with this line product. For example, 5 to 6 semi-finished lens blanks are necessary to cover unifocal prescriptions within a range of −8 to +6 diopter for the sphere component and 0 to 4 diopter for the cylinder component.

The use of semi-finished lens blanks is common in the field of ophthalmic lenses, because it is then possible to store a limited number of items while still satisfying customer needs across the entire product line. In fact, the same semi-finished lens blank reference, meaning a lens blank having a face of a certain geometry, can be used to produce an assortment of lenses satisfying a subset of wearer data and/or frame data.

SUMMARY OF THE INVENTION

The reduction in the number of items in inventory is greatly appreciated by optical laboratories and the decrease in the number of references simplifies procurement logistics.

One object of the invention is to further reduce the number of semi-finished lens blanks for a given product line. The number of references and items to be stored can therefore be further reduced and procurement costs decreased.

A method is therefore proposed for determining a semi-finished lens blank, comprising the steps of:
  determining, for a given material, a set of faces to be defined for a line of ophthalmic lenses, each face being defined for a corresponding subset of wearer data and/or frame data;
  determining, for each face, a minimum thickness requirement necessary to produce all the lenses of the corresponding subset;
  determining combinations of two faces to be paired;
  defining a semi-finished lens blank consisting of two paired defined faces and including the minimum thickness requirements respectively determined for said faces, in a manner that allows producing all the lenses of the subsets corresponding to said faces.

In the embodiments, the method for determining a semi-finished lens blank of the invention may comprise one or more of the following characteristics:
  each minimum thickness requirement is determined by calculating at least one face opposite the defined face and retaining the maximum thickness for all points, for example the set of faces opposite the defined face that are necessary to produce all the lenses of the corresponding subset;
  the opposite face or faces are calculated for wearer data and/or frame data situated at the boundary of the corresponding subset;
  each minimum thickness requirement is determined based on an already calculated minimum thickness requirement and/or semi-finished lens blank;
  each minimum thickness requirement is determined based on predetermined values;
  each minimum thickness requirement is determined by including a thickness addition or a thickness reduction;
  the two faces to be paired are positioned in relation to each other by relative rotations and/or translations of one face in relation to the other;—the two faces to be paired are determined as a function of the volume of the semi-finished lens blank having said two defined faces, the two faces to be paired are determined so as to minimize the thickness variations of the semi-finished lens blank having said two defined faces;

the two faces to be paired are determined as a function of the subsets corresponding to said two defined faces.

A semi-finished lens blank is also proposed that has two defined faces combined together, a first face being intended for producing lenses in a first subset of the wearer data and/or frame data and a second face being intended for producing lenses in a second subset of wearer data and/or frame data.

In the embodiments, the semi-finished lens blank of the invention may have one or more of the following characteristics:

two defined faces with convex surfaces;

two defined faces with toroidal surfaces; for example, each toroidal surface having a meridian of greatest curvature, the meridian of greatest curvature of the first surface is oriented perpendicularly to the meridian of greatest curvature of the second surface.

Another aspect of the invention relates to a method for producing an ophthalmic lens, comprising the steps of:

determining wearer data and/or frame data for a given wearer;

choosing a semi-finished lens blank determined according to the method of the invention;

determining the face of the semi-finished lens blank to be left alone and machining the opposite face so that the lens satisfies the wearer data and/or frame data determined for the wearer.

The method for producing an ophthalmic lens according to the invention may additionally comprise a step of determining the opposite face to be machined, by calculations based on the semi-finished lens blank and by using the wearer data and/or frame data determined for the wearer as targets.

For example, the calculations for the opposite face are made by optical optimization.

The method of the invention allows obtaining a semi-finished lens blank having two defined faces; however, these two faces are not usable simultaneously. Each face of this semi-finished lens blank satisfies a subset of wearer data and/or frame data. In the best case, the number of semi-finished lens blanks for a given product line can be reduced by half.

Other features and advantages of the invention will be apparent from reading the following description of some non-limiting examples, with reference to the attached drawings, in which.

The invention proposes determining a "double-faced" semi-finished lens blank, meaning a blank having two defined faces, each face being intended to allow producing a lens by machining the opposite face.

Figure 1A:
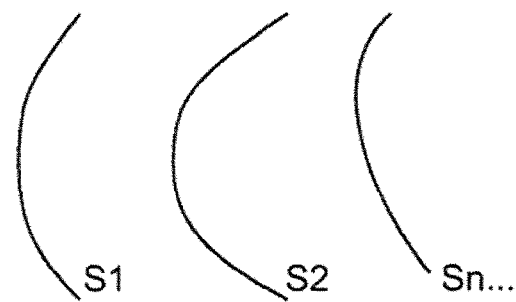
FIG. 1A to 1C are schematic views of the steps in implementing the method for determining a semi-finished lens blank of the invention.
Figure 1B:
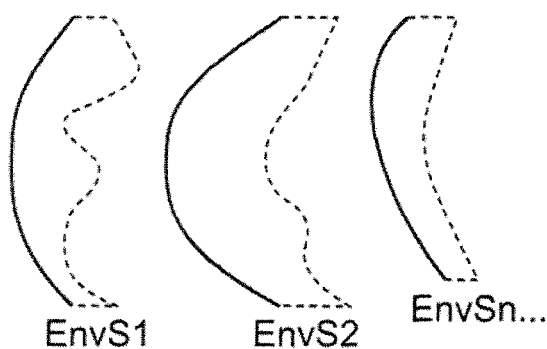
Figure 1C:
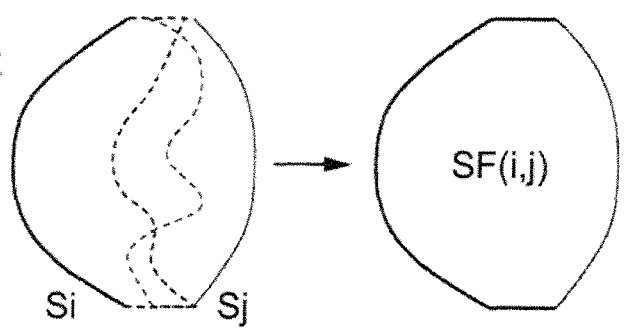

The series of FIGS. 1A to 1C schematically illustrates the main steps in determining a semi-finished lens blank of the invention.

In step A, a set of faces ($S_1, S_2, \ldots S_n$) to be defined for a line of ophthalmic lenses is determined. Each face Si is defined for a subset SEi of wearer data and/or frame data. The faces to be defined ($S_1, S_2, \ldots S_n$) can be determined according to any known method for determining faces of defined geometry of conventional semi-finished lens blanks for a given product line. The number of faces ($S_1, S_2, \ldots S_n$) determined in this manner depends on the product line concerned.

In step B, a minimum thickness requirement EnvSi is determined for each defined face Si for a corresponding subset SEI of wearer data and/or frame data. This minimum thickness requirement EnvSi defines the minimum solid needed to make the lenses in the given subset of wearer data and/or frame data SEi using the corresponding defined face Si. Each minimum thickness requirement EnvSi can be determined by calculating at least one face opposite the defined face S, and retaining the maximum thickness at every point. For example, one can calculate the set or a subset of the lenses having a face equal to the defined face Si and unite these solids (lenses) to ensure the ability to provide all the lenses in the corresponding subset SEi of wearer data and/or frame data.

A given minimum thickness requirement EnvSi can be calculated by calculating modeled lenses or calculating geometric approximations of semifinished lens blanks or lenses. For example, one can use Gullstrand's approximation equations to calculate lenses and deduce the maximum thickness at any point of a semi-finished lens blank to be used for a given subset of wearer data and/or frame data SEi using the corresponding defined face Si. One can limit the calculation of each minimum thickness requirement EnvSi to the most geometrically constraining lenses, for example those which require the greatest thickness to satisfy their prescriptions. One can also limit the calculation of each minimum thickness requirement EnvSi to the lenses located at the boundary of the corresponding subset SEi of wearer data and/or frame data. One can also determine each minimum thickness requirement EnvSi from an already calculated minimum thickness requirement and/or semifinished lens blank. For a line of existing products, the shapes and dimensions of the semi-finished lens blanks used are known; one can therefore directly deduce the minimum thickness requirement associated with each defined face. One can also determine each minimum thickness requirement. EnvSi from predetermined values. For example, in the case of a product line similar to an existing line, the orders of magnitude of each minimum thickness requirement can be estimated based on the subsets of wearer data and/or frame data concerned.

Each minimum thickness requirement EnvSi can be increased or decreased by a thickness. In the minimum thickness requirement calculations described above, one can add or subtract one or more thickness layers adjusted to take into account manufacturing and/or machining constraints on the semi-finished lens blank.

In step C, the combinations of two faces (Si, Sj) to be paired to define a semi-finished lens blank SF(ij) having two paired defined faces are determined Among the set of faces ($S_1, S_2, \ldots S_n$) defined in step A, it is attempted to find the best pairs and obtain the best possible kinematics between paired defined faces (Si, Sj). Thus a semi-finished lens blank is obtained consisting of two paired faces Si and Sj and including the minimum thickness requirement EnvSi and EnvSj respectively determined in step B for these two faces Si and Sj defined in step A. Such a semi-finished lens blank allows producing all lenses of subsets SEi and SEj of wearer data and/or frame data corresponding to the paired faces Si and Sj. The "best pair" of faces to be combined depends on the application considered. Thus step C of pairing combinations of two faces (Si, Sj) can take into account different constraints according to the applications considered.

Depending on the application, the pairing of two faces (Si, Sj) may take into account the minimum thickness requirement determined for each face (EnvSi, EnvSj) and/or the subsets (SEi, SEj) of wearer data and/or frame data corresponding to said faces and/or the geometry of the faces Si and Sj themselves.

In a first possible application, one can attempt to simplify the procurement logistics of semi-finished lens blanks as much as possible and propose pairing from the extremes of the product line and pairing from the core of the line; in this manner one can store fewer of the less frequently used parts (extremes of the product line) and provide greater inventory for the semifinished lens blanks corresponding to the core of the product line. The combinations of two faces (Sj, $S_j$) will then be paired as a function of the subsets (SEi, SEj) of wearer data and/or frame data for each face.

In another possible application, one can attempt to simplify the logistics of manufacturing lenses in optical laboratories. For example, in the case where different faces are specified for the right eye and left eye of the wearer, due to an appropriate geometry of the defined faces, the same semifinished lens blank can combine the faces (Si, Sj) respectively corresponding to a first subset SEi for the right eye and to a second subset SEj for the left eye, for the same prescription data and/or same frame data Thus the optical laboratory can be sent two identical semi-finished lens blanks for a given wearer, which simplifies the routing logistics of the semi-finished lens blanks for an order for a pair of spectacles. In this application, the pairs of faces (Si, Sj) will be assembled as a function of the subsets (SEi, SED of wearer data and/or frame data for each face.

In addition, the pairing of two faces (Si, Sj) may be constrained by the production of "double-faced" semi-finished lens blanks. One can thus attempt to combine faces which will impose fewer constraints during the manufacture of the semi-finished lens blank, particularly during molding. For example, one can attempt to minimize the total volume of the semi-finished lens blank to save material and limit the production cost. One can also attempt to minimize the variations in thickness of the semi-finished lens blank in order to make a blank which is as uniform in thickness as possible and facilitate molding. The choice of face pairings (Sj, $S_j$) will then be a function of the minimum thickness requirements (EnvSi, EnvSj) respectively calculated for said faces, and particularly a function of the variation in thickness or volume of the semi-finished lens blank SF(i,j) presenting said two paired defined faces.

During step C, the two defined faces (Si. Sj) to be paired are positioned relative to each other. This positioning is done by relative rotations and/or translations of one face with respect to the other until the best kinematics are obtained for the chosen constraints (production, lens machining, or other constraints). Each face (Sj) and each minimum thickness requirement (EnvSj) are modeled by computer; the relative rotations and/or translations can then be simulated by successive iterations until the best possible union of the minimum thickness requirements is achieved for the chosen constraints.

In this manner a "double-faced" semi-finished lens blank is obtained, meaning it has two defined faces assembled together which can each be used to produce a wearable lens.

The semi-finished lens blank of the invention has two defined faces assembled together, a first face intended for producing lenses in a first subset of wearer data and/or frame data, and a second face intended for producing lenses in a second subset of wearer data and/or frame data. The two faces of the semi-finished lens blank of the invention are therefore not intended to be used simultaneously, as the face opposite the chosen face will be machined.

In one embodiment, the two defined faces of the semi-finished lens blank are generally convex, meaning the base curve for their surface is convex. It is possible for at least one of the faces to be flat or concave, for example to allow for myopia prescriptions.

Figure 2A:
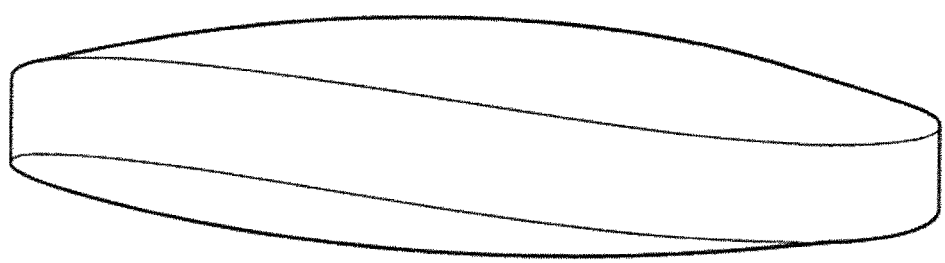
FIGS. 2A and 2B are schematic views from two perspectives of a semifinished lens blank according to an example embodiment of the invention.
Figure 2B:
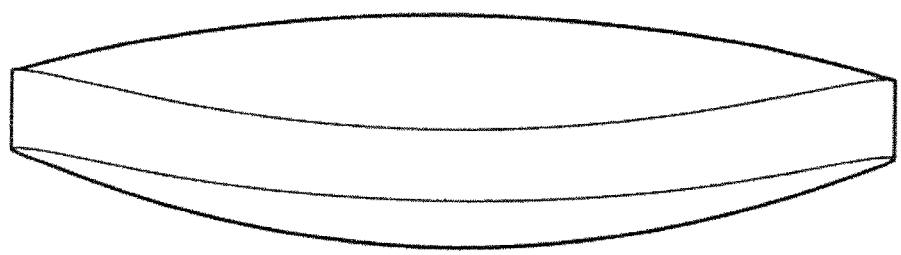

In one embodiment, the surfaces of the two defined faces of the semi-finished lens blank of the invention are toroidal. This embodiment is illustrated in the views in FIGS. 2A and 2B. The use of two toroidal surfaces allows optimal assembly of the two minimum thickness requirements of the defined faces while significantly reducing the thickness in the center of the semi-finished lens blank and therefore its volume. In particular, each toroidal surface has a meridian of greatest curvature; if the meridian of greatest curvature of the first surface is oriented perpendicularly to the meridian of greatest curvature of the second surface, the two minimum thickness requirements of the defined faces are optimally combined.

This embodiment with two toroidal surfaces is not limiting, however; the surface of at least one defined face of the semi-finished lens blank of the invention may be spherical, aspherical, or complex rather than toroidal. In particular, when the diameter of the semi-finished lens blank remains limited, for example less than or equal to 75 mm, the union of the minimum thickness requirements of non-toroidal faces can be obtained without a prohibitive thickness. In fact, when a semi-finished lens blank is made by molding, too great of a thickness (for example greater than 25 mm) may cause deformations during unmolding and complicate the molding to the point that it is unprofitable. For semi-finished lens blanks of large diameter, on the order of 80 mm or more, the use of toroidal surfaces is particularly advantageous for limiting the thickness of the semi-finished lens blank and facilitating manufacture.

For example, the thickness at the center of a "double-faced" semi-finished lens blank 80 mm in diameter can be limited to about 18 mm by using two toroidal surfaces.

The semi-finished lens blank of the invention may be obtained by molding. For example, two attached molds with a parting line define a closed mold cavity. The inner surfaces of the molds have a negative impression of the geometries of the faces to be molded. Thus each mold has a geometry corresponding to one of the faces (Sj) defined in step A described with reference to FIG. 1A. Pairs of molds are then defined from step C described with reference to FIG. 1C. A set of semi-finished lens blanks can thus be manufactured to meet the needs of a line of ophthalmic lenses, in the best case containing half as many semi-finished lens blanks as a traditional line of semifinished lens blanks.

The semi-finished lens blank of the invention may be obtained by means other than molding, for example by direct machining using appropriate equipment.

The semi-finished lens blank of the invention has, on at least one of its faces, markings which allow differentiating one face from another and positioning the lens on the appropriate equipment for machining one of the faces during lens finishing. Permanent markings, which are indelible and unmodifiable, are generally provided, as well as temporary markings to facilitate the production of a lens from a semi-finished lens blank.

The semi-finished lens blank of the invention may be used in the production of an ophthalmic lens. Once the wearer data and/or data for the frame chosen by the wearer are determined, a semi-finished lens blank is chosen which has a defined face corresponding to the subset including the given wearer data and/or frame data. The defined face chosen is retained as a final face, typically the front face of the lens, and the opposing face is calculated then machined so that the lens satisfies the wearer data and/or frame data determined for the wearer. In one embodiment, the opposing face to be machined may be determined by optical optimization from the semi-finished lens blank and using the given wearer data and/or frame data for the wearer as targets.

The method of determining a semi-finished lens blank of the invention can be used for any product line, particularly for unifocal, progressive, or complex lens lines. "Double-faced" semi-finished lens blanks determined according to the invention allow limiting the number of items stored and simplify the procurement and production logistics.

The invention claimed is:

1. A method for selecting a semi-finished lens blank having two defined faces for processing it into a finished ophthalmic lens for a given wearer, each defined face of the semi-finished lens blank being intended to allow producing an ophthalmic lens by machining an opposite face, the method comprising the steps of:
   determining a set of defined faces for a product line of finished ophthalmic lenses, each defined face of the set of defined faces being defined for a corresponding subset of wearer data, frame data, or both of possible wearers;
   determining, for each defined face of the set of defined faces, a minimum thickness requirement necessary to produce all of the lenses of the corresponding subset of wearer data, frame data, or both of possible wearers, the minimum thickness requirement being a thickness providing a minimum volume of material of a semi-finished lens blank necessary for allowing removal of material so as to process the lenses of the corresponding subset of wearer data, frame data, or both of possible wearers;
   determining combinations of two defined faces of the set of defined faces to be paired to produce subsets of paired defined faces;
   defining a set of double faced semi-finished lens blanks each consisting of two paired defined faces and including the minimum thickness requirements respectively determined for each of said paired defined faces in a manner that allows producing all of the lenses of two corresponding subsets of wearer data, frame data, or both of possible wearers for the product line of finished ophthalmic lenses;
   determining a defined face satisfying the wearer data, frame data, or both determined for said finished ophthalmic lens to be processed;
   selecting a double faced semi-finished lens blank among the defined set of double faced semi-finished lens blanks, one of the two defined faces of said selected double-faced semi-finished lens blank corresponding to the determined defined face for the finished ophthalmic lens to be processed;
   using characteristics of the determined defined face of the selected double faced semi-finished lens blank to configure a lens processing machine to enable the lens processing machine to process the opposite face of the selected double faced semi-finished lens blank to result in said finished ophthalmic lens of the product line.

2. The method of claim 1, wherein each minimum thickness requirement is determined for each pair of defined faces relative to a face opposite a face to be processed by the lens processing machine, and further comprising determining a maximum thickness at all points on each defined face of each pair of defined faces necessary to produce all of the lenses of the product line.

3. The method of claim 2, further comprising determining faces opposite the face to be processed by the lens processing machine to enable producing the set of faces of the product line.

4. The method of claim 1, wherein each minimum thickness requirement is determined based on an already calculated minimum thickness requirement, semi-finished lens blank, or both.

5. The method of claim 1, wherein each minimum thickness requirement is determined based on predetermined values.

6. The method of claim 1, wherein each minimum thickness requirement is determined by including a thickness addition or a thickness reduction.

7. The method of claim 1, wherein the two defined faces to be paired are positioned in relation to each other by relative rotations, translations, or both of one face in relation to the other.

8. The method of claim 1, wherein the two defined faces to be paired are determined as a function of the volume of the semi-finished lens blank having said two paired defined faces.

9. The method of claim 1, wherein the two defined faces to be paired are determined so as to minimize a thickness of variations of the semi-finished lens blank having said two paired defined faces.

10. A method for producing an ophthalmic lens comprising:
   determining wearer data, frame data, or both for a given wearer;
   determining a set of defined faces for a product line of finished ophthalmic lenses, each defined face of the set of defined faces being defined for a corresponding subset of wearer data, frame data, or both of possible wearers;
   determining, for each defined face of the set of defined faces, a minimum thickness requirement necessary to produce all of the lenses of the corresponding subset of wearer data, frame data, or both of possible wearers, the minimum thickness requirement being a thickness providing a minimum volume of material of a semi-finished lens blank necessary for allowing removal of material so as to process the lenses of the corresponding subset of wearer data, frame data, or both of possible wearers;
   determining combinations of two defined faces of the set of defined faces to be paired to produce subsets of paired defined faces;
   defining a set of double faced semi-finished lens blanks each consisting of two paired defined faces and including the minimum thickness requirements respectively determined for each of said paired defined faces in a manner that allows producing all of the lenses of two corresponding subsets of wearer data, frame data, or both of possible wearers for the product line of finished ophthalmic lenses;
   determining a defined face satisfying the wearer data, frame data, or both determined for said finished ophthalmic lens to be processed;
   selecting a double faced semi-finished lens blank among the defined set of double faced semi-finished lens blanks, one of the two defined faces of said selected double-faced semi-finished lens blank corresponding to the determined defined face for the finished ophthalmic lens to be processed for the given wearer;

using characteristics of the determined defined face of the selected double faced semi-finished lens blank to configure a lens processing machine to enable the lens processing machine to process an opposite face of the selected double faced semi-finished lens blank to result in said finished ophthalmic lens of the product line; and processing, using the lens processing machine, each defined face of the selected double faced semi-finished lens blank.

11. The method for producing an ophthalmic lens according to claim 10, further comprising determining each face opposite to each face to be processed, by calculations based on the semi-finished lens blank and by using the wearer data, frame data, or both determined for the wearer as targets.

12. The method for producing an ophthalmic lens according to claim 11, wherein the calculations for each opposite face are made by optical optimization.

13. The method for producing an ophthalmic lens according to claim 10, further comprising:

processing the two paired defined faces for the given wearer; and attaching faces of the selected and processed double faced semi-finished lens blanks to one another so that faces opposite to the defined faces that have been processed contact one another to result in the finished ophthalmic lens of the given wearer.

\* \* \* \* \*